May 6, 1958 — A. W. BLYTHE — 2,833,535
SUPPLEMENTAL SHOCK ABSORBER
Filed March 4, 1957
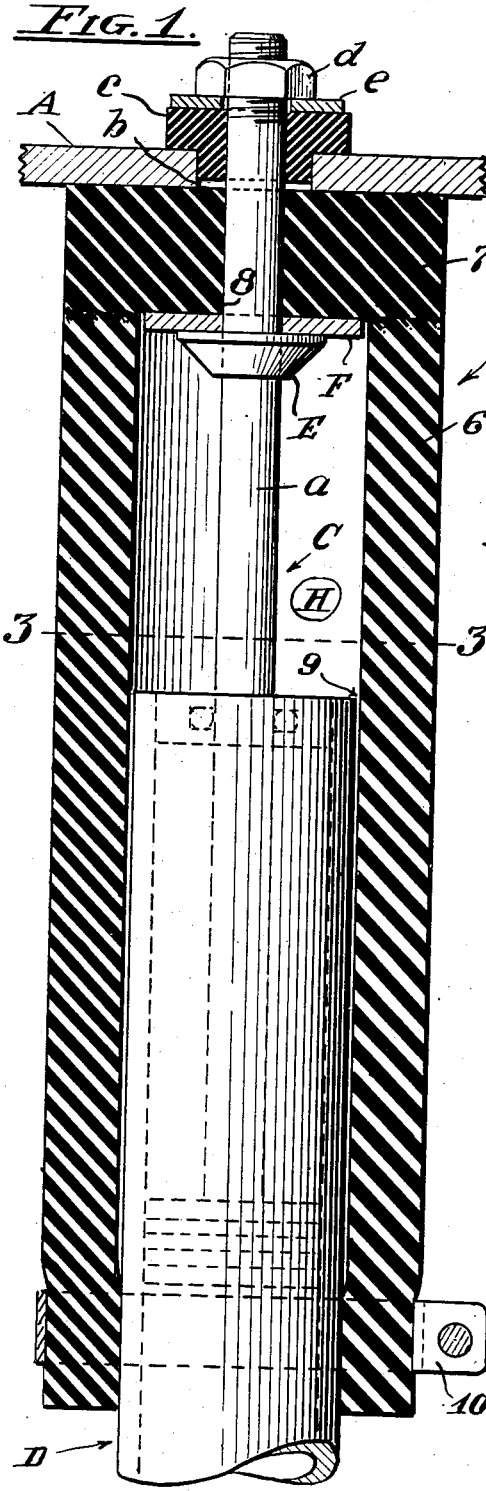
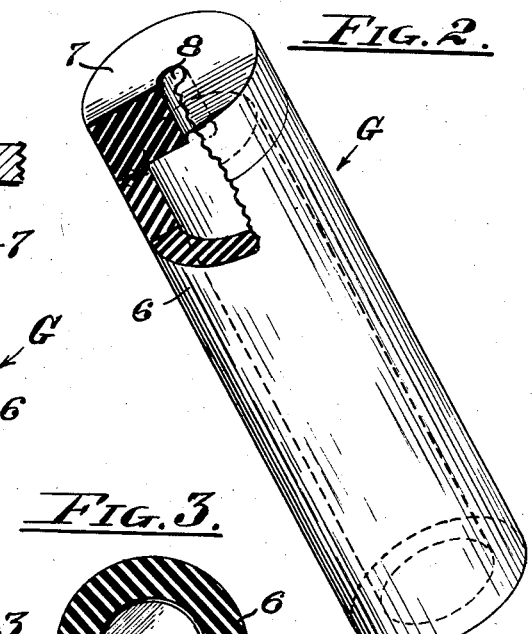
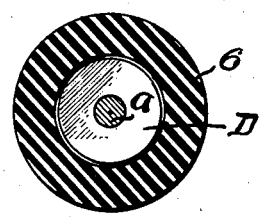
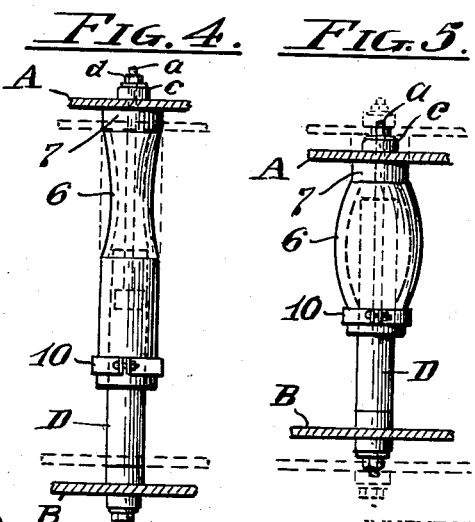
INVENTOR
Allen W. Blythe
BY
ATTORNEY

United States Patent Office 2,833,535
Patented May 6, 1958

2,833,535

SUPPLEMENTAL SHOCK ABSORBER

Allen W. Blythe, Whittier, Calif.

Application March 4, 1957, Serial No. 643,609

4 Claims. (Cl. 267—8)

This invention relates to shock absorbers and has as its primary object the provision of an attachment for conventional shock absorbers of the type employed on automobiles to supplement the operation of such shock absorbers and render their operation more efficient, and which will compensate for wear of a shock absorber to which it is applied and accordingly increase the life thereof.

The conventional shock absorber used on motor vehicles, as now on the market, and in general use, embodies a cylinder equipped with an air cushioned piston and characterized by a construction which precludes effecting repair or reconditioning thereof when excessively worn thereby necessitating its replacement. A purpose of the present invention is to lessen and need of replacements of the shock absorber when it is rendered ineffective or inefficient because of wear.

Another object is to provide a shock absorber attachment which is operable to cushion the shock absorber on initial impact and also on rebound, particularly when the vehicle to which it is applied traverses dips, chuck holes and the like, thereby inuring to smoother riding.

Another object is to provide an attachment of the above character which will serve as a safety measure in preventing or at least minimizing the action of centrifugal force in pulling a vehicle body down when traversing curves which tends to upset the vehicle and sometimes renders it uncontrollable.

Another object is to provide a supplemental shock absorbing device which can be readily applied to a shock absorber without alteration of the latter and without the use of special tools, and which may be adjusted to vary its action according to requirements and to compensate for wear of the shock absorber.

An advantageous feature of the invention resides in its action in preventing the bouncing of the vehicle wheels when applying brakes particularly on sudden application of the brakes when traveling at high speed.

Another advantage derived by the use of the invention is its sound deadening effect in eliminating noises developed in a vehicle when traveling rough roadways.

With the foregoing objects in view together with such other objects and advantages as may subsequently appear, the invention resides in the parts and in the combination, construction and arrangement of parts hereinafter described and claimed, and as illustrated by way of example in the accompanying drawings in which:

Fig. 1 is a view in longitudinal section of the shock absorber attachment showing it as applied;

Fig. 2 is a perspective view of the attachment with parts broken away showing a portion thereof in section;

Fig. 3 is a view in horzontal section taken on the line 3—3 of Fig. 1;

Figs. 4 and 5 are diagrams illustrating the mode of operation of the attachment, Fig. 4 depicting it in an extended position and Fig. 5 showing it in a depressed position.

Referring to the drawings more specifically A and B indicate generally spaced vertically opposed upper and lower relatively moveable brackets carried respectively by the frame and axle of a motor vehicle, and C and D designate respectively the piston and cylinder of a conventional shock absorber interposed between and connected respectively to the brackets A—B in the usual fashion and to which shock absorber the invention is applicable. As here shown the rod $a$ of the piston C is extended through an opening $b$ in the bracket A and through a thick hard but resilient washer $c$ seated on the upper face of the bracket A and having a portion thereof extending into the opening $b$ around the rod $a$. The outer end of the rod $a$ is threaded and receives a nut $d$ which is tightened against a metallic washer $e$ seated on the outer face of the washer $c$. The rod $a$ is provided with a fixed collar E adjacent the under side of the upper bracket A and spaced a short distance therefrom on which collar is imposed a metallic washer or ring F which, in the usual mounting of the shock absorber, bears against the underside of a resilient annular cushion (not shown) seated on the underside of the bracket. In employing the invention such cushion is preferably removed, but not necessarily so, and if removed is replaced by the attachment embodying the present invention. Such attachment comprises a cylindrical resilient tubular body G open at one end and closed in part at its other end, the body G embodying a side wall 6 and an integral end wall 7 having a central opening 8 for the reception of the outer end portion of the piston rod $a$. In applying the attachment the rod $a$ is passed through the opening 8 from the inner side of the end wall 7 to impose the latter on the washer or ring F.

In carrying out the invention the cylindrical body G is composed of rubber or similar resilient material with the side wall 6 thereof extending between the end wall 7 and the open end of the body G constituting a seamless tube of substantial wall thickness. The wall 6 is elastic so as to be deformable under pulling strains and pushing stresses imposed thereon. The cylindrical side wall 6 is of an internal diameter throughout slightly exceeding that of the cylinder D so that the wall 6 may be readily slipped over the cylinder D and then afford a slight clearance 9 between the perimeter of the latter and the inner periphery of the wall 6.

The end wall 7 while being integral with the elastic side wall 6, constitutes in effect a solid block of hard but resilient material merging into the softer more elastic material of the side wall 6 whereby the end wall 7 is rendered quite stiff and resistant to compression and expansion relative to the side wall 6.

In fabricating the cylindrical body G the walls 6 and 7 thereof are molded in one piece so as to be free of joints or seams, but the raw compounds composing the walls 6 and 7 will differ in character so that on subsequent vulcanization thereof the cured product will have the desired above recited distinctive resilient properties of the side wall 6 and end wall 7.

By the construction set forth the attachment is rendered highly durable and resistant to wear and structural failure particularly when formed of materials of high grade or quality.

In the application of the attachment the body G is positioned on the shock absorber with the side wall 6 encompassing the upper portion of the cylinder D and with the end wall 7 seated on the washer or ring F whereupon the assemblage is mounted between the brackets A—B with the upper end of the piston rod $a$ attached to the bracket A and with the lower end of the cylinder D attached to the bracket B in the usual manner. When thus mounted the hard end wall 7 is interposed between the ring F on the collar E and the bracket A and is placed under a state of compression on tightening the nut $d$ on the threaded upper end of the rod $a$ which rigidly and fixedly clamps the end wall 7 between the ring F and the underside of the bracket A.

Initially the shock absorber is disposed with the piston C in an intermediate position wherein the upper portion of the rod *a* projects above the upper end of the cylinder D which upper end is spaced below the bracket A. The side wall 6 then loosely surrounds the upper portion of the cylinder D and spans the gap between the upper end of the cylinder D and the bracket A thereby forming a dead air chamber H within the upper portion of the body G.

The lower end portion of the side wall 6 is snugly engaged with the cylinder D by a conventional hose clamp 10, thereby sealing the space interiorly of the body G and at the same time tightly affixing the body G on the cylinder D so that relative movement of the cylinder D and piston C will be transmitted to the elastic side wall 6.

In the operation of the invention compressive movement of the shock absorber, wherein the piston C and cylinder D advance relative to each other as when the brackets A—B are moved toward each other as indicated in Fig. 5, the elastic walls 6 will be expanded laterally under its inherent resistance, by displacement of the air body confined in the body G coupled with the longitudinal compressive pressure imposed on the side walls 6 by advance of the piston C and cylinder D relative to each other. The lateral expansion of the side wall 6 occurs throughout the portion of the length of such wall extending between the clamp 10 and the end wall 7. During this action the air body confined in the body G will be subjected to some pressure which with the resistance offered by the resilient wall 6 will act to cushion initial compressive movement of the shock absorber and thereby relieve the latter of sudden impact.

On rebound of the shock absorber occurring when the brackets A—B of the vehicle carrying same are caused to spread apart beyond their normal position, which effects relative outward movement of the piston C and cylinder D beyond normal, as indicated in Fig. 4, such movement of the piston and cylinder elongates the side wall 6 against its inherent resistance to stretch the wall 6 as indicated in Fig. 4 and at the same time tends to produce negative pressure interiorly of the body G thus setting up forces yieldably resisting extension of the shock absorber piston and cylinder relative to each other with gradually increasing resistance. Cushioning of the extension movement of the shock absorber beyond its normal position is thus markedly augmented. Due to the increasing resistance afforded by the attachment the shock absorber will normally reach the termination of its compressive and expansive strokes without impact or sudden jar which inures to smooth and comfortable riding of the vehicle the shock absorbers of which are equipped with the attachment.

An important feature of the invention resides in the integral formation of the hard end wall 7 and the elastic side wall 6 since provision of the hard end wall minimizes relative movement between it and the portion of the shaft *a* extending therethrough thereby reducing wear on the end wall such as to cause objectionable leakage of air from the chamber H or the pumping of air into the chamber H, it being desirable to maintain a uniform volume of air interiorly of the body G.

By the recited construction the attachment may be adjusted to vary the capacity of the air chamber H and thereby vary the tension of the device, which is accomplished by loosening the clamp 10 to disengage the lower end of the wall 6 from the cylinder D, then jacking up the vehicle frame carrying the upper bracket A to thereby elongate the shock absorber and shift the body G upwardly on the cylinder D and thus increase the length of the chamber H, or jacking up the vehicle axle carrying the lower bracket B and elevating the axle relative to the vehicle frame thereby contracting the shock absorber and shifting the body G downwardly on the cylinder D and thus decrease the length of the chamber H. On completion of the desired adjustment the clamp 10 is tightened to fixedly attach the lower end of the side wall 6 in sealed engagement with the cylinder D. The jacked up frame or axle is then restored to normal with the capacity of the chamber H varied in accordance with the adjustment as above recited.

By reason of the substantial thickness of resilient material afforded by the body G between the shock absorber and the bracket A, the body G serves to minimize the transmission of noises from the vehicle running gear or chassis to the frame thereof, this sound deadening effect being attributed largely to the clamping of the elastic side wall 6 to the shock absorber cylinder D thereby cushioning the latter against any movement relative to the piston C and also to the substantial thickness and breadth of the end wall 7 whereby on effective cushioning and silencing action is attained between the piston rod *a* and the bracket A.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. The combination with a shock absorber for positioning between a pair of relative moveable brackets, wherein the shock absorber embodies a cylinder attached at one end to one of said brackets and including a piston in said cylinder having a rod leading from the free end of said cylinder and connected to the other of said brackets; of a resilient tubular body having an elastic cylindrical side wall and having one end thereof open and provided with a unitary hard but resilient wall on its other end; said side wall encompassing said cylinder and projecting from the free end thereof with said end wall encompassing said rod with its face presented toward said other bracket, abutment means on said rod seating on the inner side of said end wall; and means clamping the free end of said side wall in sealed gripping engagement with said cylinder; there being a dead air chamber interiorly of said tubular body extending between the end wall thereof and the free end of said cylinder.

2. The structure defined in claim 1 together with means embodied in the connection between said rod and said other bracket clamping said end wall tightly between said abutment means and said other bracket.

3. The structure defined in claim 1 wherein said side wall has an inside diameter normally slightly exceeding that of said shock absorber cylinder.

4. The combination with a shock absorber embodying a cylinder having an outer end and fitted with a piston therein having a rod projecting from the inner end of the cylinder, of a resilient tubular body open at one end into which the inner end of said cylinder extends and including an end wall having an opening through which said rod extends; means connecting said rod and end wall relative to each other, said tubular body enclosing a dead air chamber extending between said end wall and the inner end of said cylinder the capacity of which is variable by relative longitudinal adjustment of said body and cylinder, and means for clamping said body in sealing gripping engagement with said cylinder in any of its adjusted positions thereon.

References Cited in the file of this patent

UNITED STATES PATENTS 2,391,120    Berthelmann _____ Dec. 18, 1945

FOREIGN PATENTS 322,338     Great Britain _____ Aug. 29, 1929
698,322     Great Britain _____ Oct. 14, 1953
65,184      France _____ Sept. 28, 1955